United States Patent
Wong et al.

(10) Patent No.: US 11,957,994 B2
(45) Date of Patent: Apr. 16, 2024

(54) PROPULSION OF A FLYING TOY

(71) Applicant: Dongguan Silverlit Toys Co., Ltd., Dongguan (CN)

(72) Inventors: Kwok Leung Wong, Causeway Bay (HK); Kei Fung Choi, Causeway Bay (HK)

(73) Assignee: DONGGUAN SILVERLIT TOYS CO., LTD, Dongguan (CN)

( * ) Notice: Subject to any disclaimer, the term of this patent is extended or adjusted under 35 U.S.C. 154(b) by 544 days.

(21) Appl. No.: 17/011,141

(22) Filed: Sep. 3, 2020

(65) Prior Publication Data
US 2022/0062781 A1    Mar. 3, 2022

(51) Int. Cl.
| | | |
|---|---|---|
| *A63H 30/04* | (2006.01) | |
| *A63H 27/00* | (2006.01) | |
| *A63H 29/22* | (2006.01) | |
| *G05D 1/00* | (2006.01) | |
| *G05D 1/10* | (2006.01) | |

(52) U.S. Cl.
CPC .......... *A63H 30/04* (2013.01); *A63H 27/001* (2013.01); *A63H 27/02* (2013.01); *A63H 29/22* (2013.01); *G05D 1/0022* (2013.01); *G05D 1/101* (2013.01)

(58) Field of Classification Search
CPC ...... A63H 30/04; A63H 27/001; A63H 27/02; A63H 27/14; A63H 29/22
USPC ............................ 446/36, 37, 38, 57, 58, 67
See application file for complete search history.

(56) References Cited

U.S. PATENT DOCUMENTS

| | | | | |
|---|---|---|---|---|
| 3,153,877 | A * | 10/1964 | Effinger, Jr. ........... | A63H 27/00 446/61 |
| 3,858,349 | A * | 1/1975 | McClendon ........... | A63H 27/00 446/57 |
| 3,985,322 | A * | 10/1976 | Mabuchi ................. | H02K 5/00 446/57 |
| 4,180,221 | A * | 12/1979 | Harris ..................... | B64C 31/06 446/57 |
| 5,947,785 | A * | 9/1999 | Bausch .................. | A63H 29/18 446/61 |
| 7,073,750 | B1 | 7/2006 | Choi | |
| 7,318,565 | B2 * | 1/2008 | Page ..................... | B64C 39/024 244/54 |
| 7,789,340 | B2 | 9/2010 | Choi | |
| 7,980,510 | B2 * | 7/2011 | Tanabe .................. | B64C 39/028 244/105 |
| 9,375,650 | B1 | 6/2016 | Goitein | |
| 9,682,329 | B1 | 6/2017 | Goitein | |
| 2008/0125002 | A1 * | 5/2008 | Goitein .................. | A63H 27/00 446/57 |
| 2009/0017714 | A1 * | 1/2009 | DeRennaux ........... | A63H 17/00 446/93 |

(Continued)

*Primary Examiner* — Joseph B Baldori
(74) *Attorney, Agent, or Firm* — Greenberg Traurig, LLP

(57) ABSTRACT

Control of a toy flying toy plane comprises providing the plane having a motor and propeller and a separate remote controller for use by a player of the toy. The plane includes a flexible, foldable wing and a fuselage below the wing. The fuselage supports at least one propulsion unit and the fuselage is removably locatable relative to the wing. A signal is sent from a transmitter with the toy to the controller. A variation in intensity of the received signal to the toy being from the controller. The controller transmits a signal to the toy according to the desired action of the player and thereby to cause the flying toy to move as required.

18 Claims, 17 Drawing Sheets

(56) References Cited

U.S. PATENT DOCUMENTS

2014/0008496 A1* 1/2014 Ye ........................ B64C 39/024
                                                    244/190
2016/0136533 A1* 5/2016 Tanous ................... A63H 29/24
                                                    446/57
2018/0095492 A1* 4/2018 Matloff .................... G05G 5/05

* cited by examiner

PROPULSION OF A FLYING TOY

BACKGROUND

The present disclosure relates generally to flying model airplane structures, and, more particularly, to a propulsion system for a flying model airplane.

SUMMARY

Flying model airplanes, often also referred to as toy flying airplanes, have enjoyed a long-lasting and extensive popularity among children and adults for many years. The continuous development of model airplanes has included the development of small scale self-powered toy or model airplanes intended for amusement and entertainment. In addition, remotely controlled aircraft using either a controlling tether or radio signal transmission link has further improved the realism and enjoyment of toy and model airplanes.

Model airplanes capable of flight typically use one or more small internal combustion engines or electric motors driving one or more propellers. These motors and propellers are mounted on the front of the wings of the airplane.

In more detail, most available radio control (RC) toy planes typically have one propeller on the plane nose with two actuators, such as servo motors or solenoids for elevator and rudder control. This configuration is expensive, uses complicated hardware, and is heavy. Other available RC toy planes may have two propellers located on the leading edge of the wing without any elevator and rudder control. It would be desirable to have an improved structure for a flying model airplane.

This disclosure in one form discloses a method to provide a propulsion system for a lightweight plane with a foldable, flexible or deformable wing.

The present disclosure concerns a propulsion and control system and method to direct and control a flying toy such as toy plane. With this control function, it is easy to have propel a pane and have fight control as the user operates the controller relative of the flying toy.

A propulsion system is releasably located relative to a wing of a plane and a control system is used to control and/or maintain the orientation of flying toy with a remote controller. This control method is selectively basically related to the signals between a controller and a receiver on the toy plane for controlling one or more motors on the plane.

Many advantages and features of the disclosure will become readily apparent from the following detailed description of the disclosure and the embodiments thereof, and from the accompanying drawings.

DRAWINGS

Figure 1A:
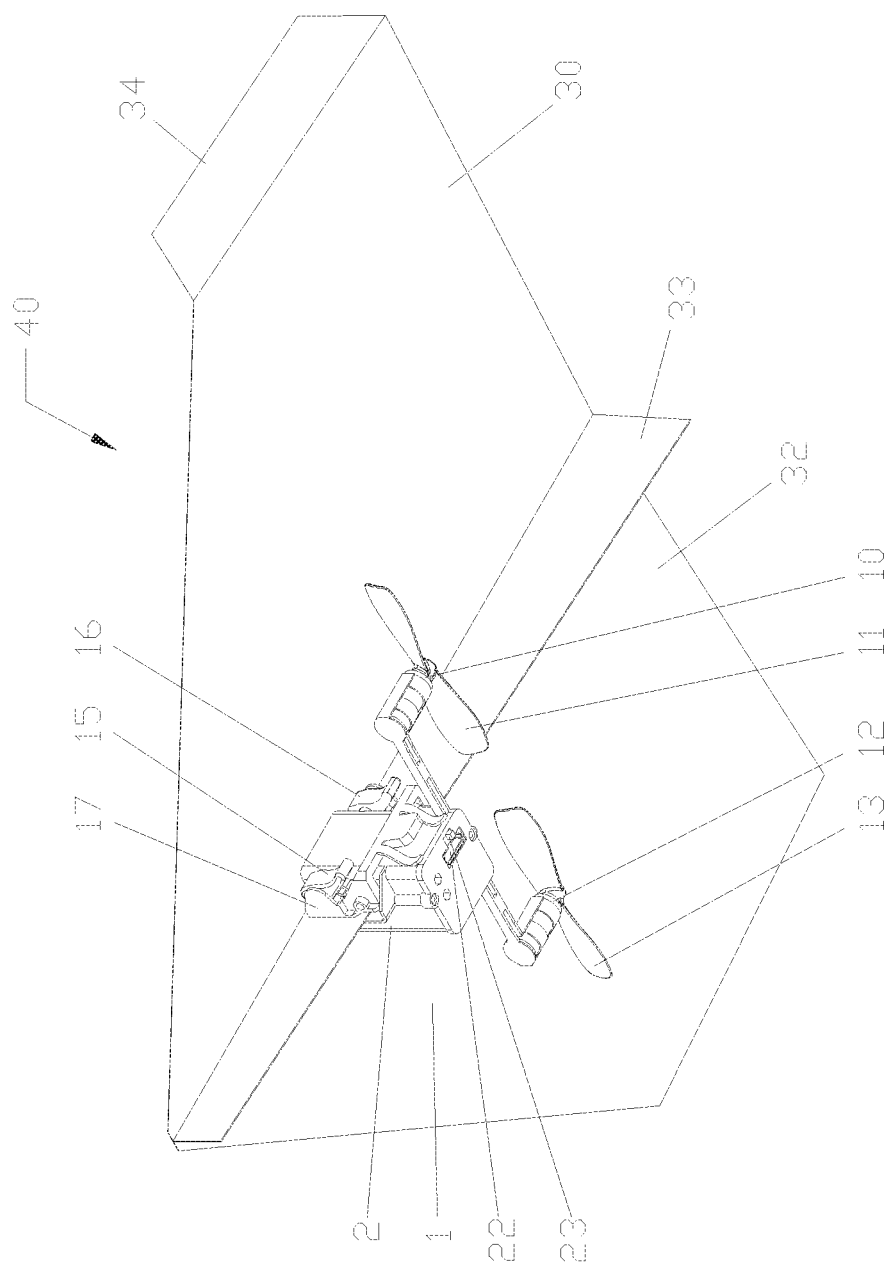
Figure 1B:
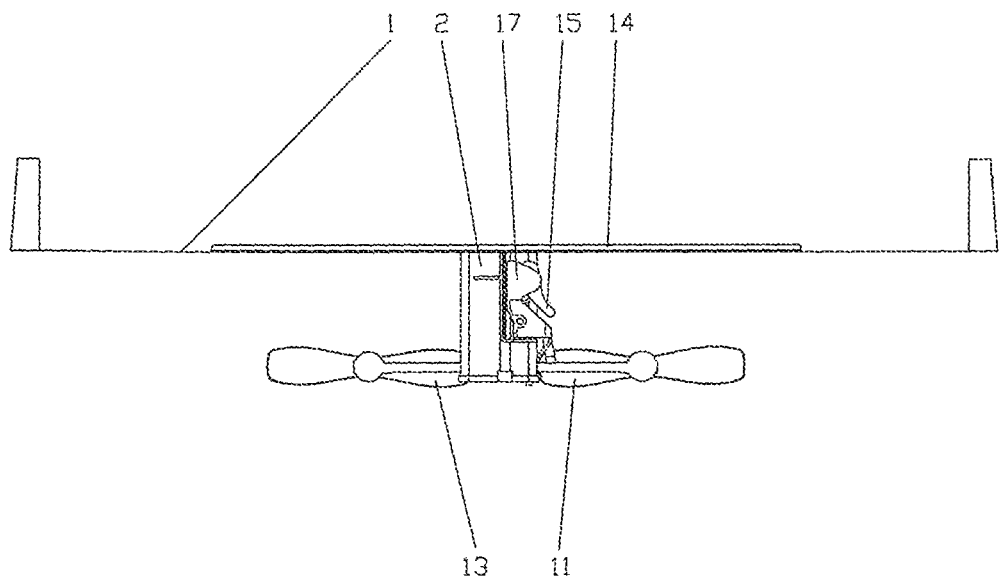
Figure 1C:
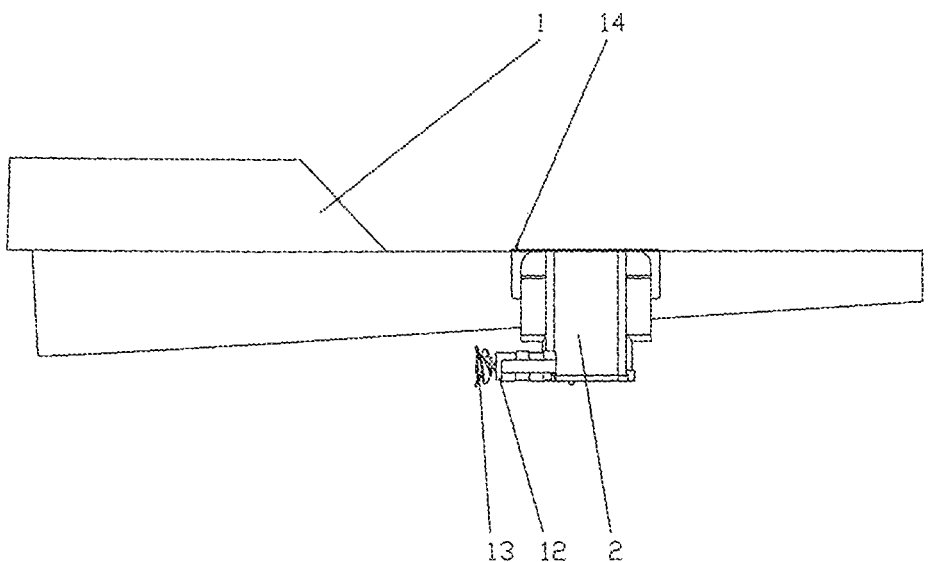
Figure 1D:
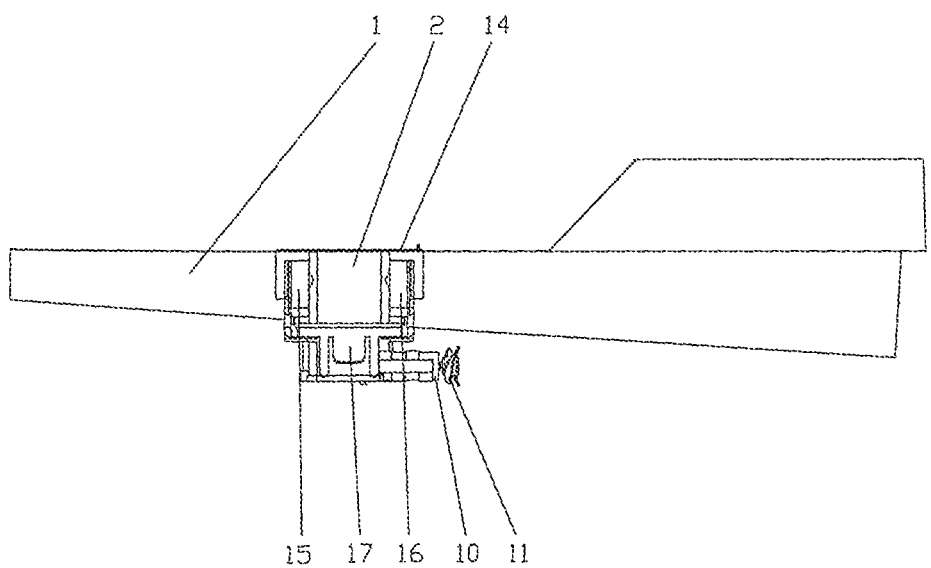
Figure 1E:
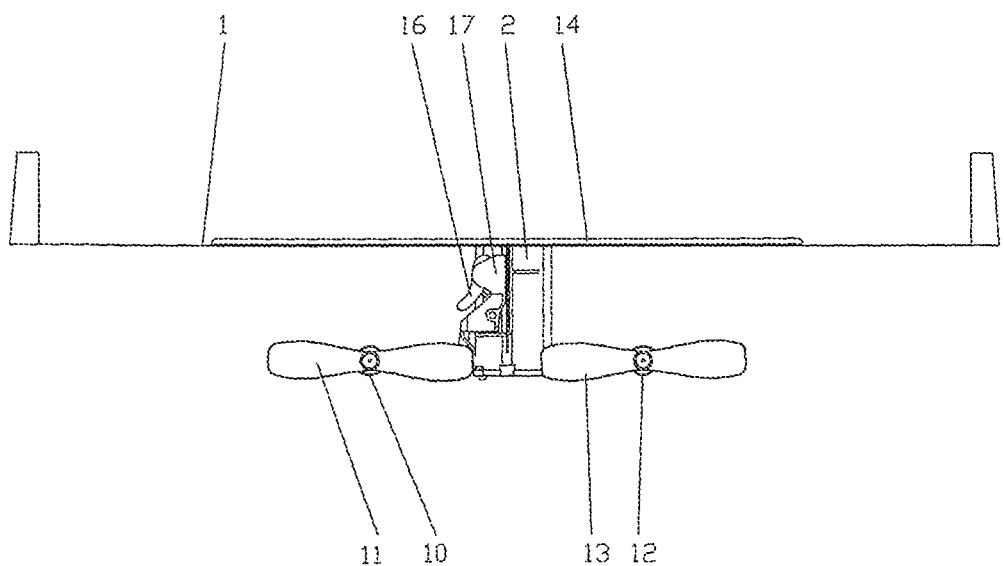
Figure 1F:
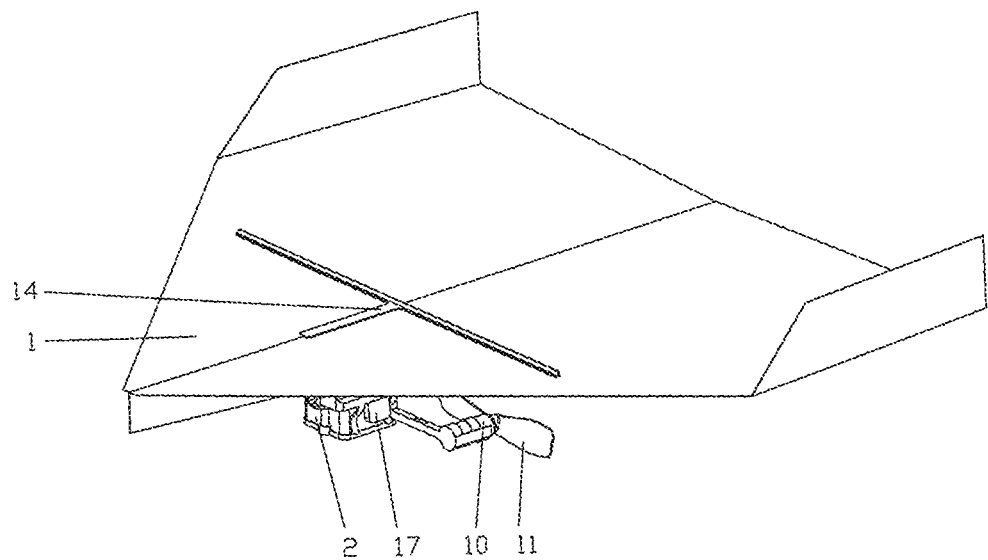
Figure 2A:
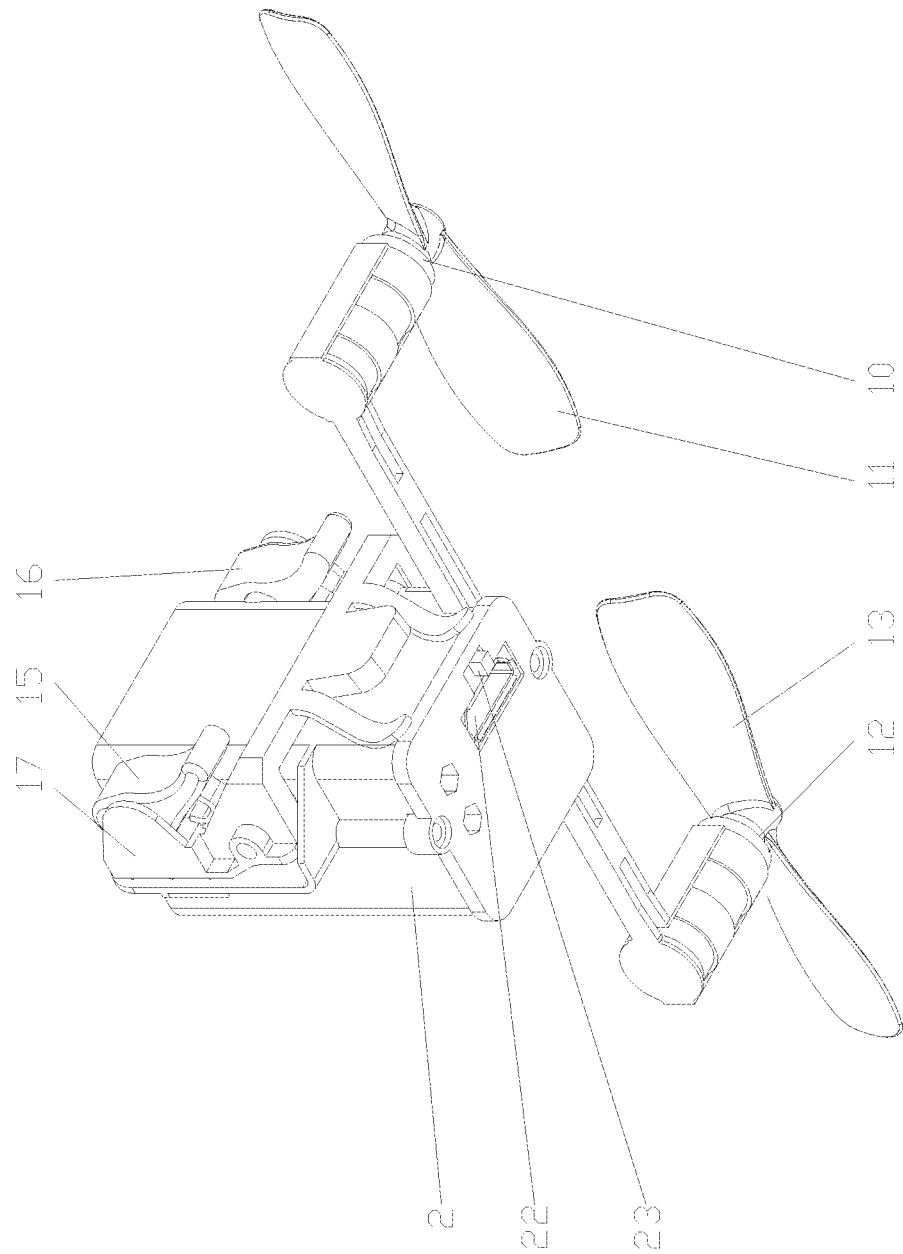
Figure 2B:
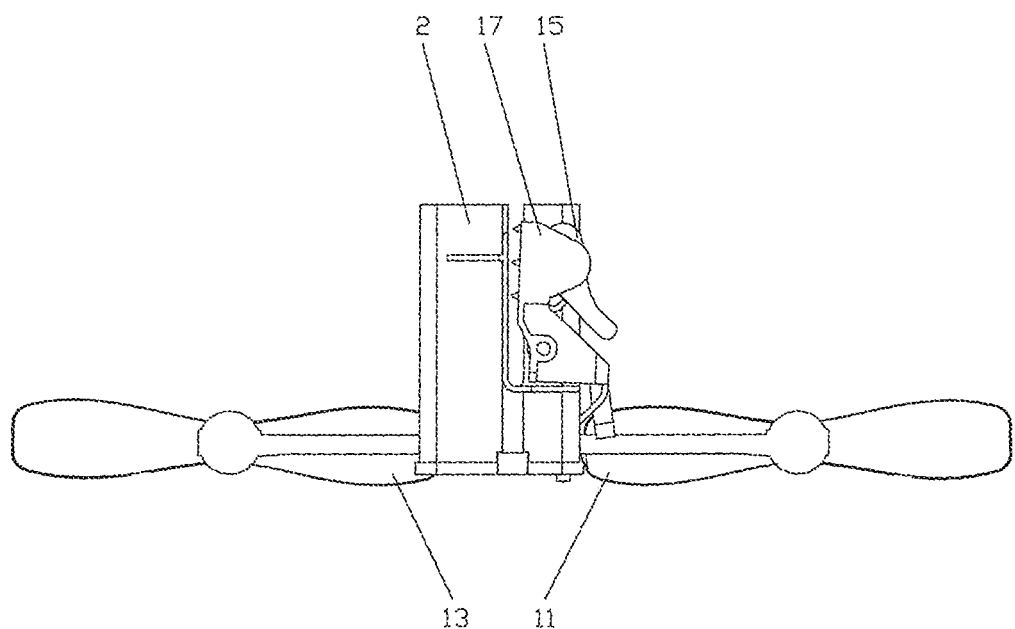
Figure 2C:
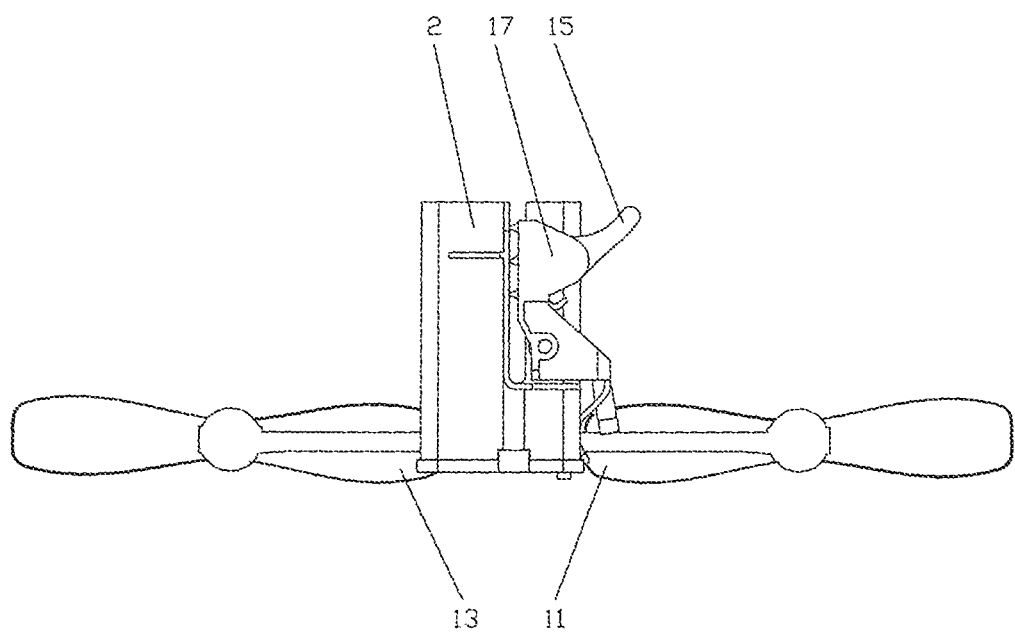
Figure 2D:
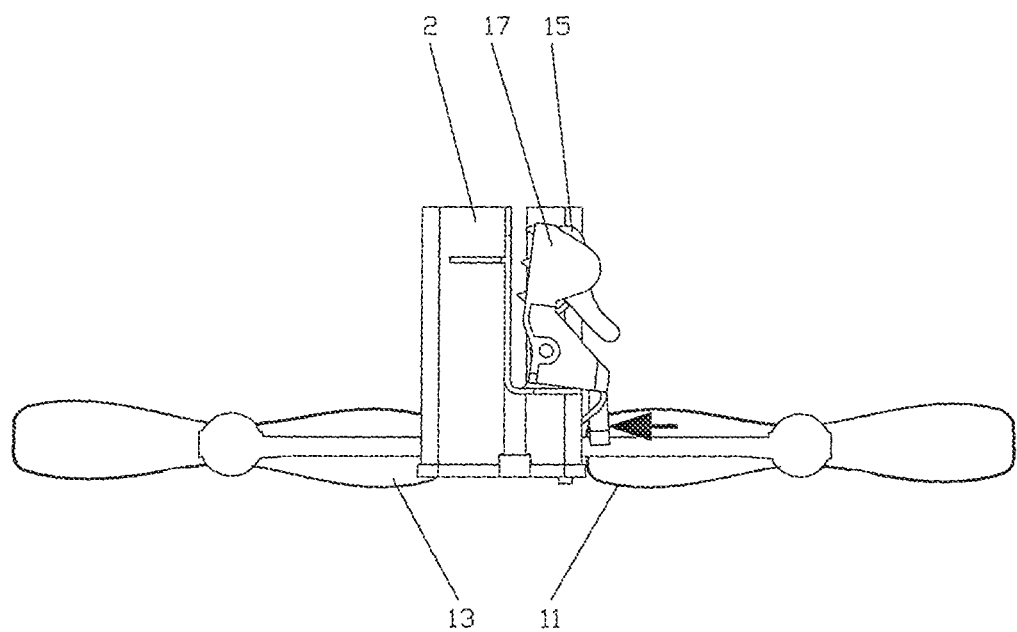
Figure 2E:
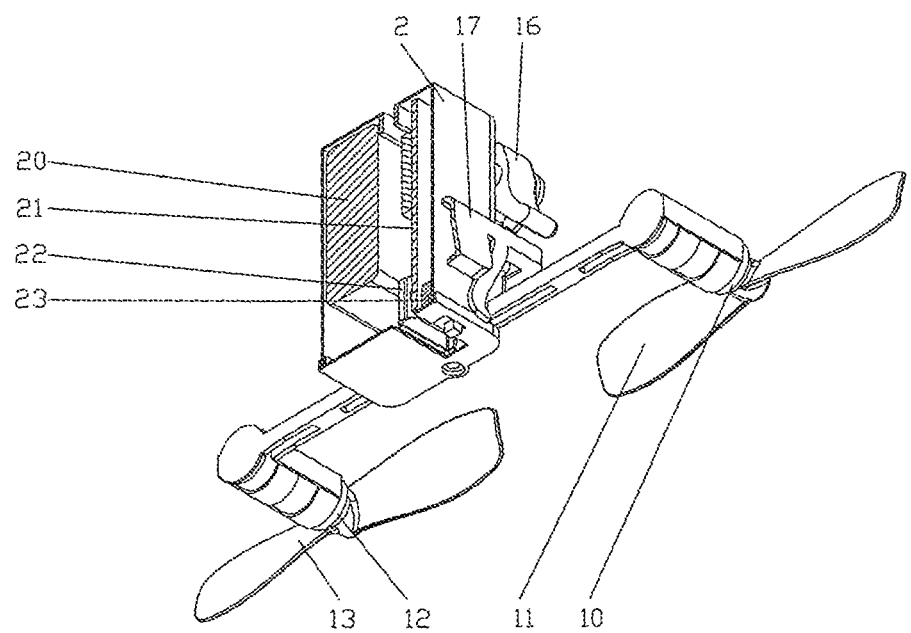
Figure 3:
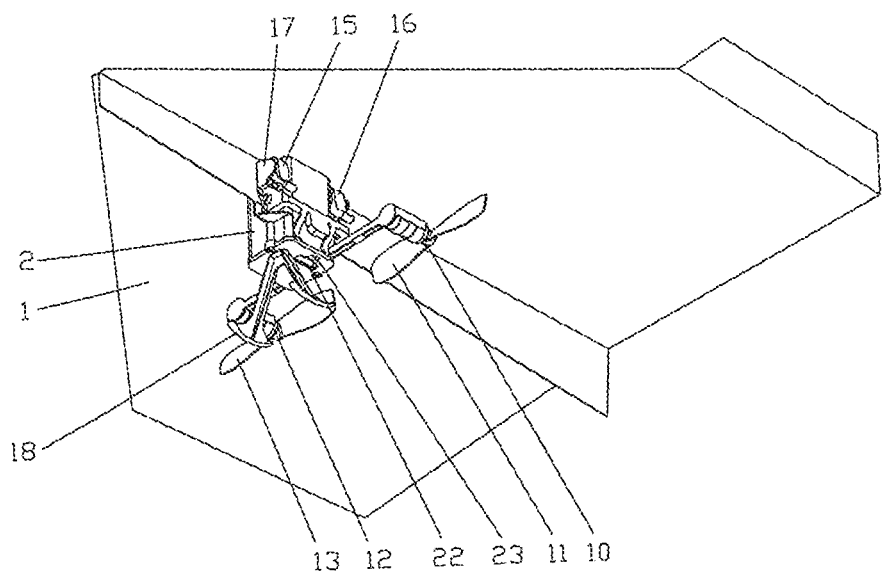
Figure 4:
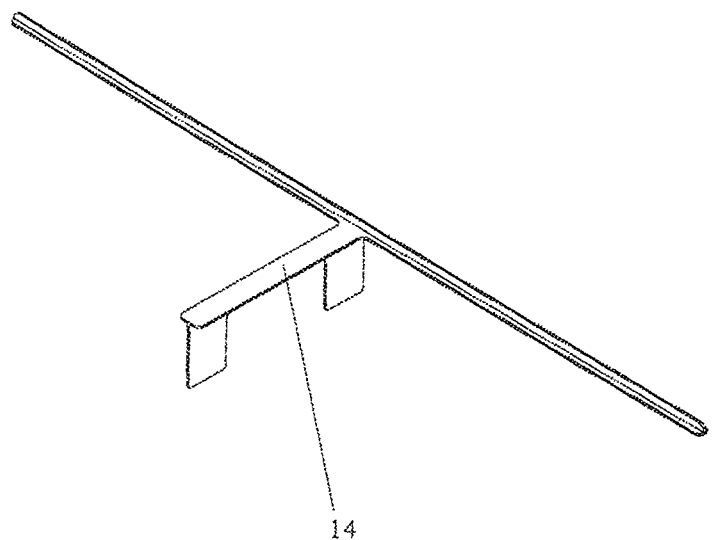
Figure 5:
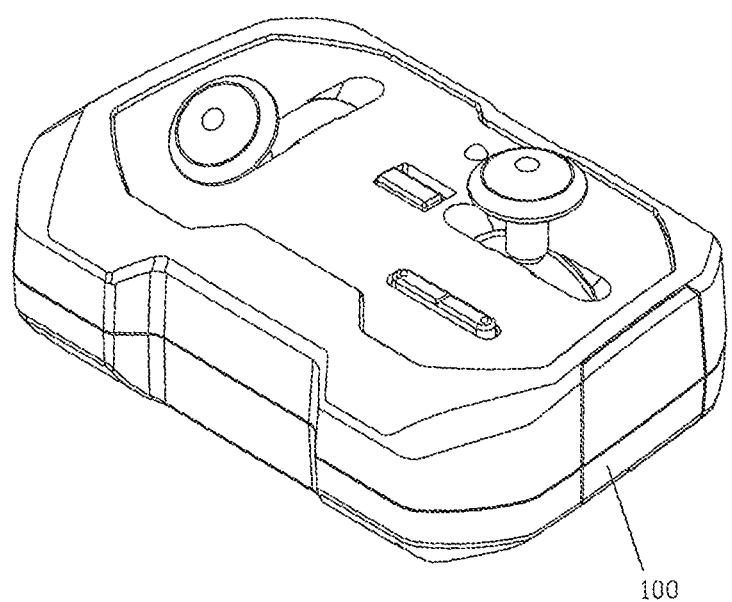
Figure 6:
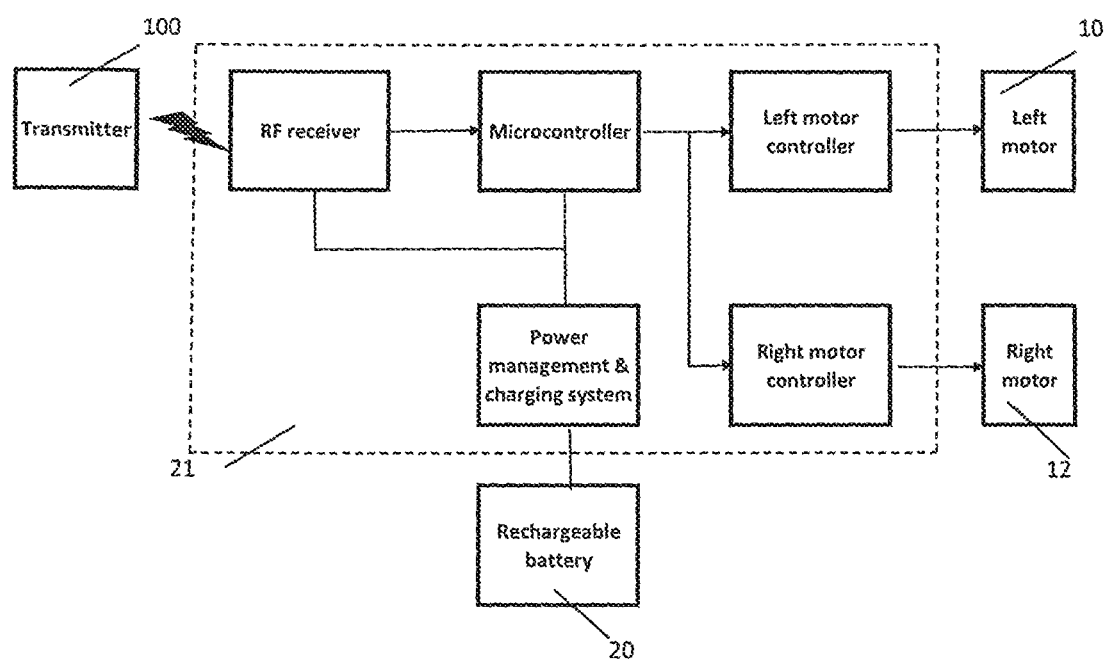
Figure 7:
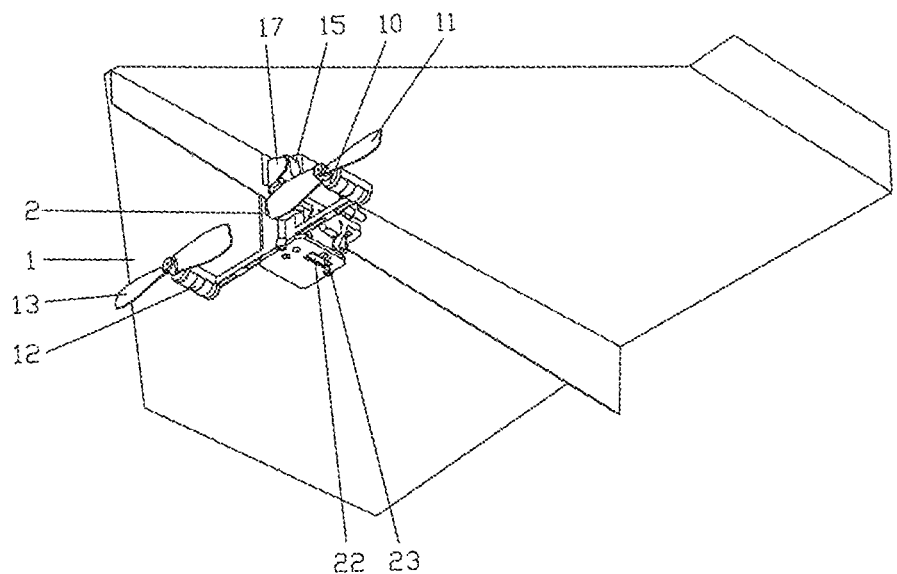
Figure 8:
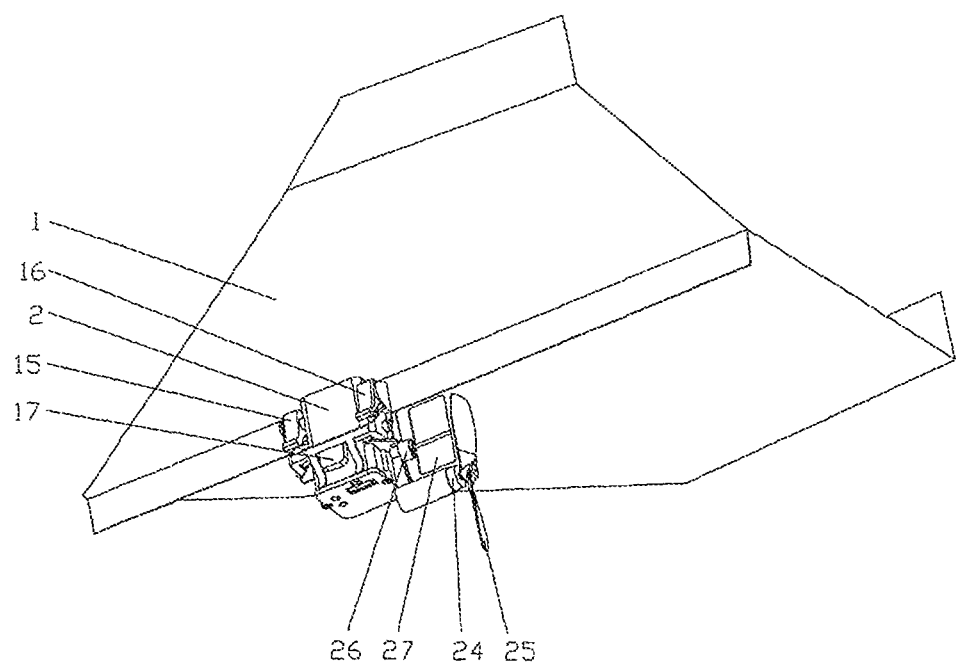

For a more complete understanding of the present disclosure, reference is now made to the following figures, wherein like reference numbers refer to similar items throughout the figures:

FIG. 1a. The perspective view of paper plane.
FIG. 1b. The front view of paper plane.
FIG. 1c. The left-side view of paper plane.
FIG. 1d. The right-side view of paper plane.
FIG. 1e. The rear view of paper plane.
FIG. 1f. Second perspective view of paper plane.
FIG. 2a. The perspective view of fuselage.
FIG. 2b. The front view of fuselage in an unlocked position.
FIG. 2c. The front view of fuselage in a locked position.
FIG. 2d. The front view of fuselage in clip release status.
FIG. 2e. The cross-sectional view of fuselage.
FIG. 3. The perspective view of paper plane with landing gear.
FIG. 4. The perspective view of spreader.
FIG. 5. The perspective view of transmitter.
FIG. 6. The block diagram of control system.
FIG. 7. The first and second propulsion unit in alternative position.
FIG. 8. The single propulsion unit plane system.

DESCRIPTION

The exemplification set out herein illustrates particular embodiments, and such exemplification is not intended to be construed as limiting in any manner.

The disclosure is capable of being implemented in embodiments in many different forms. There are shown in the drawings and will be described herein, in detail, some of the embodiments of the present disclosure. The present disclosure is to be considered an exemplification of the principles of the disclosure and is not intended to limit the spirit or scope of the disclosure and/or the embodiments illustrated.

The disclosure is directed to a moveable and adjustably locatable and releasable propulsion system for a plane. It also concerns a system of controlling the propulsion system with a flying toy such as toy plane, and the system for affecting this control and the toy which is operable in this manner.

There is a system and method of remote controlling a direction of a toy flying vehicle, the vehicle having one or more motors for rotating respective propellers relative to a fuselage of the plane. There is a separate remote controller for use by a player of the toy.

Some features of the disclosure are a light wing aircraft 40 having:
- a clip-and-lock element with a fuselage 2 to provide a simple but secure method for player to mount the fuselage 2 with and wholly under, a plane body, being a wing feature 1
- the wing feature 1 may be formed of a flexible, selectively foldable material which may have different thickness and folding techniques and shapes. The material can be paper or a board material. This material can be of a different selected of a different thickness
- the function of the clip is to lightly or slightly hold the fuselage to the plane, namely the wing
- this is affected by pressing and releasing clip inwardly or outwardly relative to a protrusion of the plane 40, an elongated longitudinal axially directed strip of material formed below the wing 1.

Other features of the disclosure are:
- a player can adjust the Centre of Gravity of the whole plane easily while shifting the fuselage a bit forward or backward along the longitudinal axis
- once the suitable fuselage position is located, the clip is locked in position with the strip
- the clip can be formed as two spaced elements: a front element and rear element which lock and engage the strip. The fuselage and the plane can be mounted firmly to reduce the risk of fuselage dislocation after impact Some other features of the disclosure are:
- A spreader for direction from the fuselage and for location relatively transversely above or under the wing The spreader is used to provide some support and relative rigidity to the flexible wing material of a paper plane There are preferably two propellers from the fuselage, although in different situations there can be a single propeller A flying toy airplane comprises a wing 1 supported by a fuselage 2, the wing 1 extending from opposite sides of the fuselage 2, so there are two half parts 30, 32 of the wing 1. There is a first propulsion unit having a first motor 10 and a first propeller 11 rotatable by the first motor 10. The unit is mounted on one lateral side of the fuselage 2. There is a second propulsion unit with a second motor 12 and a second propeller 13 rotatable by the second motor 12. This unit is mounted on an opposite lateral side of the fuselage 2.

The wing 1 is formed of a deformable or foldable material and includes a downwardly depending ridge 33 centrally disposed from the wing 1. The ridge 33 is longitudinally directed between a position towards a front or forward location and a rearward location and is located on the plane bottom. The ridge is centrally located relative to or between both wing portions or halves 30, 32. The fuselage 2 is for releasable engagement with the ridge 33.

The wing 1 is a paper or board of foldable or flexible material. Selectively, it is a selected light material being a polyfoam, EPP, EPE, EPS, thin-film, or cardboard.

The fuselage 2 has an elongated section with at least one clip 17 for a locking location with the ridge 33 and released location in a position adjacent to and removed from the ridge 33.

The airplane can have at least one winglet 34 extending from the wing 1, and selectively a rudder 27 for the plane 40, the rudder 27 being selectively located on, with or as part of the fuselage 2.

The airplane can have a winglet 34 respectively upwardly directed at each lateral end of each respective half of the wing 1 to either side of the fuselage 2.

There is laterally directed spreader 14 located across and below each wing part 30, 32, and the spreader 14 provides wing rigidity and maintains a dihedral angle of each side of the wing. The spreader 14 is attached to the fuselage 2 directly above the wing 1. The spreader 14 has at a least one limb, and selectively two spaced limbs depending from the lateral direction of the spreader 14. The limb or limbs are for location with the fuselage 2 and the ridge 33 and for being releasably lockable in location which the clip or clips 17 are closed.

The fuselage 2 is mounted totally under the wing 1 in a longitudinal axis. The first propulsion unit has a first motor 10 and propeller 11 for rotation in one direction, and located at one transverse side of the fuselage 2 along transverse axis. A second propulsion unit has a second motor 12 and propeller 13 rotating in opposite direction, and is located at the other transverse end of the fuselage 2 along transverse axis.

There is a flight controller 21 with the fuselage 2. The flight controller 21 includes a microcontroller and an RF receiver for receiving a control signal from a remote transmitter 100. The microcontroller is operable to decode an RF signal for controlling the rotational speed difference between the first and second propellers 11 and 13. This assists the plane 40 in making a turn and in elevation control.

There can be motion sensor such as a gyroscope, accelerometer and magnetometer for aerodynamic stability and orientation control. The processor is operable to control a rotational speed difference between the first and second propellers 11 and 13 to assist the airplane 40 in making a turn.

The two propellers are rotatable in relatively opposite directions.

The fuselage 2 includes a rechargeable battery inside a body of the fuselage for providing power to a flight controller board and the motors 10 and 12. There is a built-in charging system inside the fuselage 2 for recharging the battery via a USB plug or connector 22.

A clip-and-lock unit mounts the fuselage 2 to a plane body. The clip 17, when closed is for lightly holding the fuselage 2 to the ridge 33 of the plane 40. The clip 17 is releasable and closable under finger pressure in different longitudinal positions relative to the ridge 33 under the wing 1. In this manner the plane 40 to thereby adjust the center of gravity of the airplane easily by shifting the fuselage a forwardly or backwardly along longitudinal axis on the ridge 33.

There can be a pair of clip and lock units 15, 17. The first one is located at a front end and a second one located at a rear end. This affects a relatively firm mounting to reduce the risk of fuselage dislocation in the event of impact of the plane on the ground.

The airplane can include a detachable landing gear 18 on the bottom of fuselage 2 to facilitate taking off and landing.

There is an RC transmitter 100 which is a mobile device for communication with the controller via Bluetooth or Wi-Fi.

In another form the flying toy airplane comprises a wing 1 supported by a fuselage 2. The wing 1 extends as two half portions 30, 32 on opposite sides of the fuselage 2. There is a single propulsion unit with a motor 24 and a propeller 25 rotatable by the motor 10 mounted on the fuselage 2. A rudder control mechanism support pitch and yaw control.

The wing shape can be a delta wing formation.

The disclosure includes a fuselage and a selection of different foldable flexible wing units to form different plane shapes. This could be provided as a kit so that a player can create different flying toys, namely planes with different shapes using the same fuselage. Different folding instructions can be provided as part of the kit.

In some forms the plane can land and take off with the undercarriage. In other forms it can be hand launched. The propulsion unit on the fuselage maintains the flight as desired or controlled by the player with the handheld transmitter.

Numbering system relative to the drawings is as follows:

| No. | Part Name |
| --- | --- |
| 1 | Paper plane |
| 2 | Fuselage |
| 10 | Left motor |
| 11 | Left propeller |
| 12 | Right motor |
| 13 | Right propeller |
| 14 | Spreader |
| 15 | Front lock |
| 16 | Rear lock |
| 17 | Clip |
| 18 | Landing gear |
| 20 | Rechargeable battery |
| 21 | Flight controller board |
| 22 | USB socket |
| 23 | On/off switch |
| 24 | Main motor |
| 25 | Main propeller |
| 26 | Actuator |
| 27 | Rudder |
| 100 | Transmitter |

The toy and controller selectively transmit and receive signals through a transmitter receiver system, and the signals contain data to regulate a horizontal and/or vertical direction and also includes power intensity information.

The signals contain respectively direction and intensity information, selectively, at different discrete levels, and can include a control signal for controlling the airplane toy to move forward or turn.

The receiver in the plane is for communication with the remote transmitter controller, and the remote controller is capable of adjusting and controlling speed and direction of the plane. The receiver receives throttle and direction control commands from the remote controller.

The figures illustrate perspective views of a flying model airplane 40. The flying model airplane has a fuselage 2, and a wing 1 which has two portions 30, 32 to either side of the fuselage 2 and extending from opposite sides of the fuselage 2. A first propulsion unit, having a motor 10 and a propeller 11 rotatable by the motor, is mounted to the fuselage 2 totally under the wing 1. A second propulsion unit, having a motor 12 and a propeller 13 rotatable by the motor 12, is mounted to the opposite side of the fuselage 2. The second propulsion system is also totally under the wing 1.

The airplane fuselage is formed of a break-resistant material such as, for example, a polyfoam or other soft and/or deformable materials so that a crash or hard landing by airplane does not cause significant structural damage. The wings of the airplane are also formed of a break-resistant foldable material.

A receiver unit may be mounted on the bottom of airplane under the wing to receive control signals (e.g., from a ground-based transmitter unit) for use in controlling the flight of airplane. A charging socket of the receiver unit may be used to couple a rechargeable battery mounted in the fuselage to an external charger, e.g., in the transmitter unit.

The transmitter unit for use in controlling the flight of airplane has an antenna that may be used to communicate with receiver unit. The transmitter unit can have a throttle to control power to the motors, and for directing airplane to turn left or right. Implementing left and right direction control can be by varying the relative speeds of the two propellers, which can turn in opposite rotational directions relative to each other.

The figures show a block diagram of a control system for controlling the airplane by radio control. The control system may be included as part of receiver unit in airplane. Control system includes a processor (e.g., a microcontroller) coupled to control the first and second motors. A radio frequency (RF) signal may be demodulated by an RF receiver and decoded by decoder and processor in order to control the speed of the motors using controllers.

The processor may be programmed to control a rotational speed difference between the first and second propellers and to assist the airplane in making a turn. To control the direction of flight of airplane, the one propeller, for example, should spin faster than the other propeller to make a right turn, and vice versa for a left turn.

As another example, to control the turning of the plane to the left, the right propeller may be controlled to spin faster than the left propeller. As a result, the right side of the wing will be become a higher than the left side and the plane will thus turn left. A similar concept may be applied when the plane is to turn right.

In other embodiments, turning may also be controlled further or alternatively using the rudder. In this embodiment the rudder is attached to part of the fuselage, and as illustrated this is an embodiment with a single motor The airplane is a typically light-weight airplane designed for immediate re-use and flight after one or more minor crashes into the ground or other obstacles (i.e., airplane is somewhat crash-resistant). It is expected that such minor crashes will not prevent the continued flying enjoyment of a user of airplane. The propulsion system and placement as described above aids in enabling this re-use by helping to avoid catastrophic failures of the propellers or other features of the airplane that might otherwise be damaged by a front-mounted placement as in prior model planes. The size of airplane may be, for example, less than 12 inches long and 10 inches wide, and the weight of airplane including a rechargeable battery may be, for example, less than about 50 g. The material of the propulsion system and wings are of a nature that they are not easily destroyed by a normal kind of landing.

By the foregoing disclosure, an improved structure and method for propelling a flying model airplane have been described. The foregoing description of specific embodiments reveals the general nature of the disclosure sufficiently that others can modify and/or adapt it for various applications without departing from the generic concept. Therefore, such adaptations and modifications are within the meaning and range of equivalents of the disclosed embodiments. The phraseology or terminology employed herein is for the purpose of description and not of limitation.

In another design, the spreader can be attached to fuselage directly underneath the wings. The clip and lock design can be in different forms.

The signals are usually modulated at an appropriate frequency for transmission while the receiving module can filter the noise out of these frequency range and demodulate the signal for MCU decoding.

The apparatus and method have been described in terms of what are presently considered to be the most practical and preferred embodiments, it is to be understood that the disclosure need not be limited to the disclosed embodiments.

It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A flying toy airplane comprising:
    a wing formed of a deformable or foldable material and having a centrally disposed longitudinal ridge downwardly depending from the wing dividing the wing into two halves, the wing having two ends, the wing being supported by a fuselage completely beneath the wing releasably fastened to the ridge, the wing extending outward above opposite lateral sides of the fuselage beneath the wing;
    a first propulsion unit, having a first motor and a first propeller rotatable by the first motor, mounted on one of the lateral sides of the fuselage beneath the wing;
    a second propulsion unit, having a second motor and a second propeller rotatable by the second motor, the second propulsion unit being mounted on the other opposite lateral side of the fuselage beneath the wing; and
    a pair of clip and lock units for mounting the fuselage to the ridge, each clip when closed being for lightly holding the fuselage to the airplane, and being releasable and closable under finger pressure in different longitudinal positions relative to the airplane to thereby adjust the center of gravity of the airplane easily by shifting the fuselage forwardly or backwardly along the ridge forming a longitudinal axis of the airplane, a first one of the clip and lock units located at a front end of the fuselage and a second one of the pair of clip and lock units located at a rear end of the fuselage.

2. The airplane of claim 1 wherein the wing is a paper or board foldable material or selected lightweight material being a polyfoam, EPP, EPE, EPS, thin-film, or cardboard.

3. The airplane of claim 1 including at least one winglet extending from one of the two ends of the wing, and a rudder for the airplane located on the fuselage.

4. The airplane of claim 1 including an upwardly directed winglet at each of the two ends of the wing.

5. The airplane of claim 1 including a laterally directed spreader located across the two halves of the wing, the spreader providing wing rigidity and maintaining a dihedral angle of the wing, the spreader being above each wing half and the spreader having at a least one limb depending from the spreader in a lateral direction, the limb being for location with the fuselage and the ridge and for being releasably lockable in position.

6. The airplane of claim 5 wherein the limb of the spreader is attached to the fuselage directly underneath the wing.

7. The airplane of claim 1 wherein the first propulsion unit rotates its propeller in one direction and the second propulsion unit rotates its propeller in an opposite direction to rotation of the first propulsion unit propeller.

8. The airplane of claim 1 including a flight controller operable with the fuselage, the flight controller including a microcontroller and an RF receiver for receiving a control signal from a remote transmitter, the microcontroller being operable to decode an RF signal for controlling the rotational speed difference between the first and second propellers to assist the plane in making a turn and elevation control, and one or more of a motion sensor, a gyroscope, an accelerometer and a magnetometer for aerodynamic stability and orientation control.

9. The airplane of claim 8 including an RC transmitter being a mobile device for communication with the controller via Bluetooth or WiFi.

10. The airplane of claim 8 wherein the processor is operable to control a rotational speed difference between the first and second propellers to assist the airplane in making a turn, and wherein the propellers are rotatable in relatively opposite directions.

11. The airplane of claim 1 including a rechargeable battery inside the fuselage for providing power to a flight controller board and the motors, and a built-in charging system inside the fuselage for recharging the battery via a USB plug or connector.

12. The airplane of claim 1 including a detachable landing gear on the bottom of fuselage to facilitate taking off and landing.

13. The airplane of claim 1 wherein the wing is a delta wing formation extending to both sides of the fuselage.

14. A flying toy airplane comprising:
a wing formed of a deformable or foldable material and having a centrally disposed longitudinal ridge downwardly depending from the wing dividing the wing into two halves, the wing having two ends, the wing being supported by a fuselage completely beneath the wing releasably fastened to the ridge, the wing extending outward above opposite lateral sides of the fuselage beneath the wing;
a first propulsion unit, having a first motor and a first propeller rotatable by the first motor, mounted on one of the lateral sides of the fuselage beneath the wing;
a second propulsion unit, having a second motor and a second propeller rotatable by the second motor, the second propulsion unit being mounted on the other opposite lateral side of the fuselage beneath the wing; and
a pair of clip and lock units for mounting the fuselage to the ridge, each clip when closed being for lightly holding the fuselage to the airplane, and being releasable and closable under finger pressure in different longitudinal positions relative to the airplane to thereby adjust the center of gravity of the airplane easily by shifting the fuselage forwardly or backwardly along the ridge forming a longitudinal axis of the airplane, a first one of the pair of clip and lock units located at a front end of the fuselage and a second one of the pair of clip and lock units located at a rear end of the fuselage, thereby effecting a relatively firm mounting to reduce the risk of fuselage dislocation in the event of impact of the plane on the ground, including a laterally directed spreader located across each half of the wing, the spreader providing wing rigidity and maintaining a dihedral angle of each wing, the spreader being above each wing and the spreader having at a least two limbs depending in a lateral direction from the spreader, the limbs being relatively spaced apart, and being for location with the fuselage and the ridge and for being releasably lockable in location with the pair of clip and lock units.

15. A flying toy airplane comprising a wing formed of a deformable or foldable material and including a downwardly depending longitudinal ridge centrally disposed from the wing supported by a fuselage completely beneath the wing releasably fastened to the ridge;
a first propulsion unit having a single motor and a propeller rotatable by the single motor mounted on the fuselage beneath the wing;
a pair of clip and lock units for mounting the fuselage to the ridge, each clip when closed being for lightly holding the fuselage to the airplane, and being releasable and closable under finger pressure in different longitudinal positions relative to the airplane to thereby adjust the center of gravity of the airplane easily by shifting the fuselage forwardly or backwardly along the ridge forming a longitudinal axis of the airplane, a first one of the clip and lock units located at a front end of the fuselage and a second one of the pair of clip and lock units located at a rear end of the fuselage;
a rudder fastened to the fuselage; and
a rudder control mechanism to support pitch and yaw control.

16. The airplane of claim 15 wherein the propeller is directed to face rearwardly relative to the forward direction of the plane.

17. A fuselage for a flying toy airplane having a wing for supporting the fuselage entirely beneath the wing, the wing extending outward above and from opposite sides of the fuselage, the wing including a downwardly depending longitudinal ridge centrally disposed from the wing; the fuselage including a first propulsion unit attached to the fuselage located beneath the wing, having a first motor and a first propeller rotatable by the first motor; and
a pair of clip and lock units for mounting the fuselage to the ridge, each clip when closed being for lightly holding the fuselage to the airplane, and being releasable and closable under finger pressure in different longitudinal positions relative to the airplane to thereby adjust the center of gravity of the airplane easily by shifting the fuselage forwardly or backwardly along the ridge forming a longitudinal axis of the airplane, a first one of the clip and lock units located at a front end of the fuselage and a second one of the pair of clip and lock units located at a rear end of the fuselage.

18. The fuselage of claim 17 including a second propulsion unit, having a second motor and a second propeller rotatable by the second motor, the respective first and second propulsion units respectively being mounted adjacent to each other wherein they are locatable on opposite sides of the ridge.

\* \* \* \* \*